US008422696B2

(12) United States Patent
Kim

(10) Patent No.: US 8,422,696 B2
(45) Date of Patent: Apr. 16, 2013

(54) APPARATUS AND METHOD FOR REMOVING NOISE

(75) Inventor: Gang-Youl Kim, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 413 days.

(21) Appl. No.: 12/507,250

(22) Filed: Jul. 22, 2009

(65) Prior Publication Data

US 2010/0020980 A1 Jan. 28, 2010

(30) Foreign Application Priority Data

Jul. 22, 2008 (KR) ........................ 10-2008-0070995

(51) Int. Cl.
*H04B 15/00* (2006.01)
*H04R 3/00* (2006.01)

(52) U.S. Cl.
USPC .......................................... 381/94.1; 381/110

(58) Field of Classification Search ................. 381/71.7, 381/94.1, 94.3, 94.7, 92; 379/406.03
See application file for complete search history.

(56) References Cited

U.S. PATENT DOCUMENTS

| | | | | |
|---|---|---|---|---|
| 5,492,129 | A * | 2/1996 | Greenberger | 600/528 |
| 6,363,344 | B1 * | 3/2002 | Higuchi | 704/226 |
| 6,377,637 | B1 * | 4/2002 | Berdugo | 375/346 |
| 7,003,099 | B1 * | 2/2006 | Zhang et al. | 379/406.03 |
| 7,248,708 | B2 * | 7/2007 | Vaudrey et al. | 381/94.7 |
| 8,068,619 | B2 * | 11/2011 | Zhang et al. | 381/92 |
| 2004/0202336 | A1 * | 10/2004 | Watson et al. | 381/92 |
| 2005/0031136 | A1 * | 2/2005 | Du et al. | 381/92 |
| 2008/0317259 | A1 * | 12/2008 | Zhang et al. | 381/92 |

* cited by examiner

*Primary Examiner* — Fan Tsang
*Assistant Examiner* — Eugene Zhao
(74) *Attorney, Agent, or Firm* — Stanzione & Kim, LLP

(57) ABSTRACT

Disclosed is a method of efficiently removing noise. The method includes: deciding a noise section by attenuating characteristics of a voice in a voice signal mixed with noise; determining the type of the noise in the decided noise section; and removing the noise from the noise-mixed voice signal by using noise information obtained through the determination. A clustering method or a similarity level measurement method is used to determine the type of the noise. Even in a voice signal that is mixed with various types of noise, noise can be precisely removed and thus distortion of a sound quality can be minimized.

12 Claims, 6 Drawing Sheets

BEFORE NOISE REMOVAL

AFTER NOISE REMOVAL

APPARATUS AND METHOD FOR REMOVING NOISE

BACKGROUND OF THE INVENTION

1. Field of the Invention

The present invention relates to an apparatus and a method for noise removal, and more particularly to an apparatus and a method for removing noise that occurs during a call.

2. Description of the Related Art

When a user makes a call using a mobile communication terminal, various noise signals according to a neighboring environment can be input through a microphone within a terminal. One of the most important factors affecting a sound quality is environmental noise. Accordingly, a noise suppressing method provides a potential differentiation factor to manufacturers of a mobile communication terminal.

In large, noise as described above includes stationary noise and non-stationary noise. The stationary noise refers to consistent and relatively time-invariant noise such as car noise or wind noise, and the non-stationary noise refers to time-varying noise where the voice of people or various types of noise are mixed together, especially in a restaurant, a department store, etc. Since the occurrence of noise degrades a sound quality, various noise removal methods can be used to remove such noise of the other party during a call.

As one of the noise removal methods, there is a method using one microphone. This method assumes an initial signal with a period of several milliseconds as the noise. This method removes noise in a noise area and a voice area by obtaining Signal-to-Noise Ratio (SNR) based on the signal, and updates the initial noise signal in the noise area and subtracts the noise in the voice area without any update. With such a one microphone-using noise removal method, it is not easy to distinguish between noise and voice, and in the case of the non-stationary noise, the noise in the voice section also varies. Therefore, a significant distortion of the voice signal takes place when the noise is removed by using previous noise data. To overcome these technological limitations, noise removal algorithms by mounting two or more microphones and using a signal processing have been proposed.

Referring to FIG. 1, an example of such a two microphone-using method will be described. FIG. 1 is an exemplary diagram of a mobile communication terminal having two microphones mounted, wherein a microphone 10 is mounted on the front side of the mobile communication terminal, the microphone 10 receiving the voice of a speaking person, and a microphone 20 is mounted on the back side thereof, the microphone 20 receiving noise. Through the microphone 10 of the front side, the utterance of the speaker is mostly input simultaneously while background noise is input. Further, through the microphone 20 of the back side, the utterance signal of a speaker is input relatively slightly because the signal is attenuated as a function of a distance and noise similar to the noise through a microphone 10 of the front side is input. Thus, a speaker direction signal is actually input via the front side microphone 10, like reference number 30 of FIG. 2 and a noise direction signal having a relatively small size of a voice signal is input via the back side microphone 20, like reference number 40.

An internal block diagram of an apparatus functioning to separate a noise signal from a voice signal by mounting such two microphones is shown in FIG. 3. Referring to FIG. 3, when a signal in a speaker direction microphone 310 and a signal in a noise direction microphone 320 are input, the time-domain signal is converted to a frequency-domain signal through each frequency domain conversion unit 330A, 330B. The converted frequency domain signal is divided into a noise signal and a voice signal via a signal separation algorithm 340. Herein, a usable algorithm includes a signal separation algorithm such as a blind signal separation, a beam-forming algorithm, etc., which acts to separate a voice signal and a noise signal from two incoming signals. Such a separated signal contains remaining noise, and a remaining noise eliminator 350 outputs a voice signal with the remaining noise removed. Because the signal up to this point is a frequency domain signal, a time domain conversion unit 360 re-converts the voice signal in the frequency domain into a time domain signal.

Supposing that there are N signals basically, the prior art signal separating algorithm can separate all signals only when there are inputs through N microphones. Therefore, if there are two signals including a voice signal and a noise signal, a two microphone-using noise removal method is used for signal separation. But, because a noise signal in an actual environment is not a single pure signal but is a mixed signal containing various types of noise, it is impossible to completely remove noise by using the blind signal separation algorithm, which requires a strong dependence on a post-processor. Further, in an environment where a lot of reverberations occur, the reverberations may delude a user to recognize existence of multiple signals and it is thus impossible to properly carry out the noise removal processing. In this case, only when a post-processor has good performance as well, it is possible to remove the noise and prevent a sound quality distortion. Also, in the case of using a beam-forming algorithm as a signal separation algorithm, it is possible to remove noise only when the beam is formed in a desired direction by using many microphones. Therefore, it is difficult to achieve good performance by using only two microphones.

SUMMARY OF THE INVENTION

Accordingly, the present invention provides an apparatus and method for noise removal, which can reduce distortion of a sound quality by efficiently removing noise in various environments where various noise sources are input.

In accordance with an aspect of the present invention, there is provided a noise removal apparatus including a first microphone mounted close to a speaker and at least two second microphones spaced a predetermined distance from the first microphone, including: a first and second frequency domain conversion units for converting a first and a second voice signal mixed with noise to frequency domain signals when the first and second voice signals are input from each of the microphones; a bin comparator for determining if the current section is a voice section or a noise section by using each of the converted first and second voice signals; a subtraction unit for subtracting a voice signal component from the converted second voice signal; a noise clustering unit for determining, based on a result of the determination by the bin comparator, the noise type of the second voice signal, in which the voice signal component has been subtracted in the noise section; and a noise removal algorithm unit for removing noise corresponding to the noise type from the converted first voice signal.

In accordance with an aspect of the present invention, there is provided a noise removal method by a noise removal apparatus including a first microphone mounted close to a speaker and at least two second microphones spaced a predetermined distance from the first microphone, including the steps of: determining if the current section is a voice section or a noise section when the first and second voice signals are input from each of the microphones; subtracting a voice signal component from the converted second voice signal; based on a result of the determination, determining the noise type of the second voice signal, in which the voice signal component has been subtracted in the noise section; and removing noise corresponding to the noise type from the first voice signal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
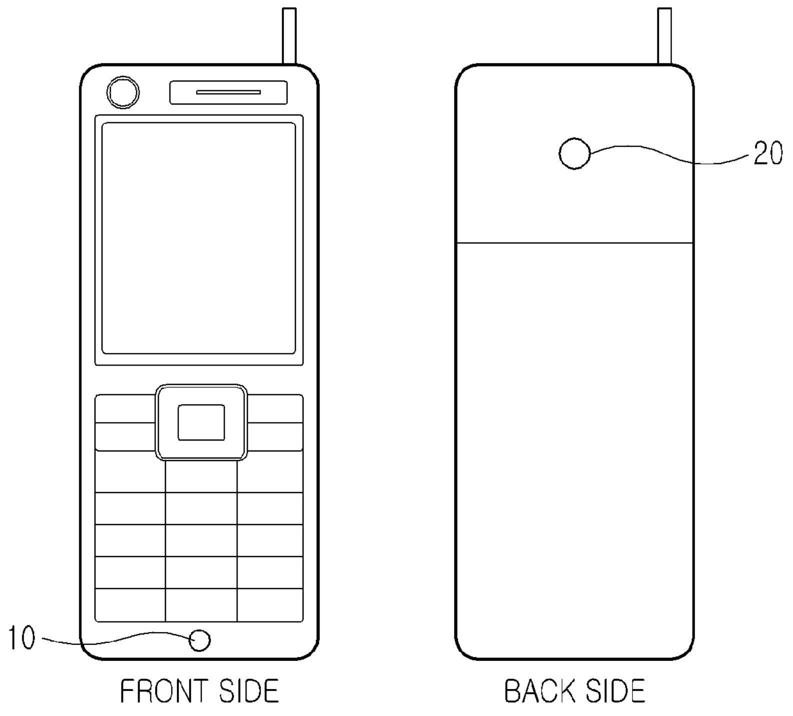
FIG. 1 is an exemplary diagram of a mobile communication terminal on which two microphones are mounted.
Figure 2:
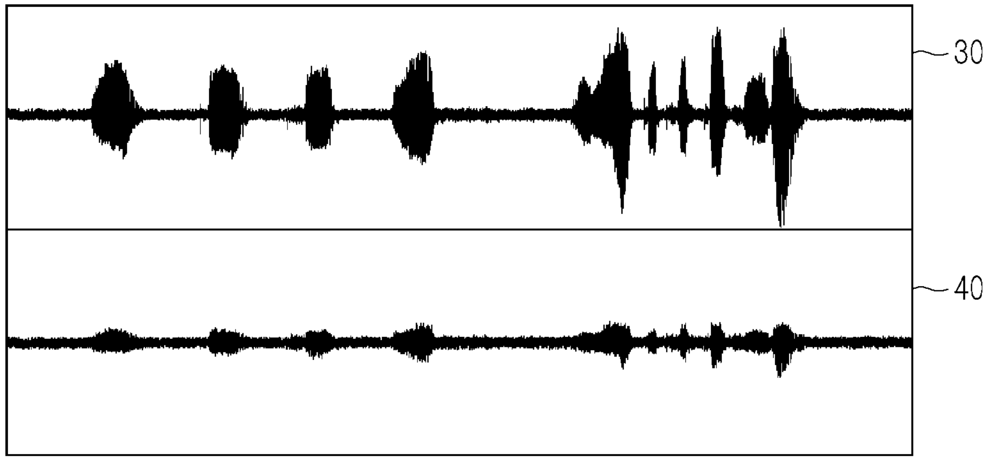
FIG. 2 is an exemplary diagram of a signal input through respective microphones.
Figure 3:
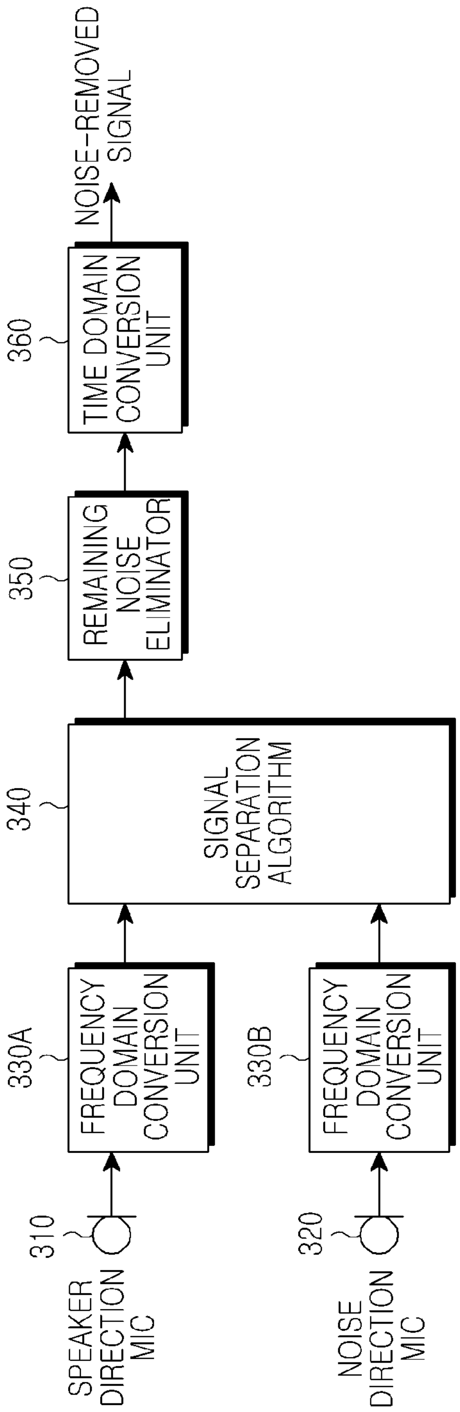
FIG. 3 is an internal block diagram of the prior art noise removal apparatus.

Hereinafter, exemplary embodiments of the present invention will be described in detail with reference to the accompanying drawings. In the drawings, the same elements will be designated by the same reference numerals possibly throughout the entire drawings. Further, in the following description of the present invention, a detailed description of known technologies incorporated herein will be omitted when it may make the subject matter of the present invention rather unclear.

The present invention proposes a solution of efficiently removing noise. To this end, the present invention includes the steps of deciding a noise section while attenuating characteristics of a voice in a voice signal mixed with noise, determining the noise type in the decided noise section, and removing the noise from the noise-mixed voice signal by using noise information obtained through the determination. Herein, a clustering method and a similarity level measurement method are used in determining the noise type. By doing this, the noise can be precisely removed even from a voice signal mixed with various types of noise, and thus a sound quality distortion can be minimized.

Figure 4:
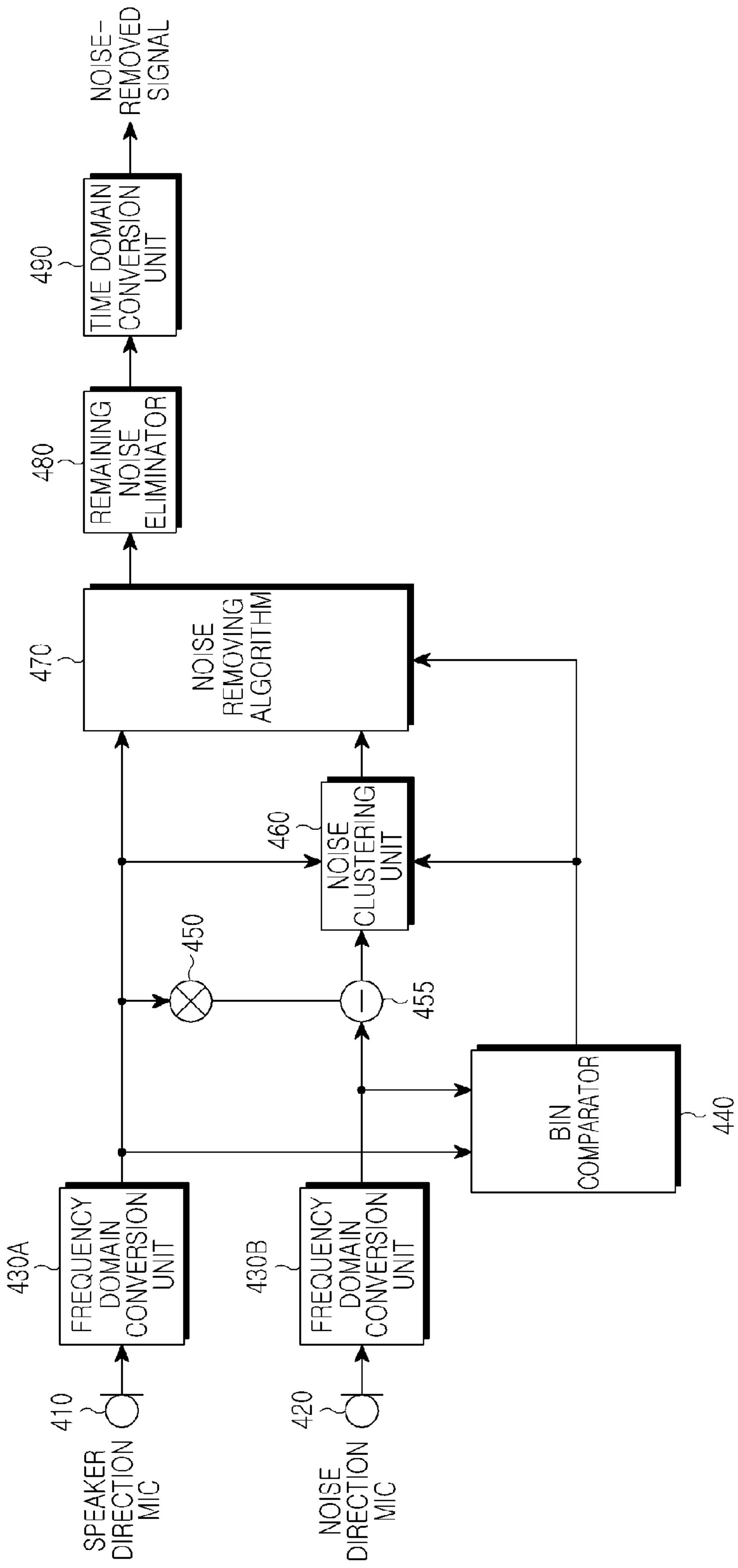
FIG. 4 is an internal block diagram of a noise removal apparatus according to an embodiment of the present invention.

An operation of a noise removal apparatus having the above-mentioned function realized will be described with reference to FIG. 4. FIG. 4 shows an internal block diagram of a noise removal apparatus according to an embodiment of the present invention, and the following description resides in the case of two-channel microphone input through two microphones but the present invention is applicable to a case where a multiple of microphones are mounted. Here, the noise removal apparatus includes a microphone mounted close to a speaker and at least two microphones mounted at some distance from the microphone.

Referring to FIG. 4, a signal through a speaker direction microphone 410 and a signal through a noise direction microphone 420 are input. Through the microphone 410 in the speaker direction, the utterance of the speaker is mostly input while background noise is input, since it is at a short distance from the speaker. Through the microphone 420 in a noise direction, because the utterance signal of a speaker is attenuated as a function of a distance, the speaker utterance is input relatively slightly while simultaneously background noise is input at nearly identical magnitude.

In general, in the case of a mobile communication terminal, a speaker direction microphone in the mobile communication terminal is placed at about several centimeters from a mouth of a speaker, and a noise direction microphone is mounted on the other side and at over 10 cm distance away from the speaker side microphone. Then, nearly identical noise signals are input to two microphones and a voice of the speaker is input to the speaker direction microphone with great energy, because a noise source is placed exceedingly far away compared to a distance between two microphones. However, since a sound attenuates in the air inversely proportional to the square of a distance, a voice signal of relatively small volume is input to the noise direction microphone. Since it is possible to know the distance between microphones mounted on a mobile communication terminal in advance, it is also possible to understand in advance the volume of a voice signal input through the noise direction microphone. It goes without saying that it is possible to obtain in advance the volume of the voice through measurements by an experiment, and a detailed description thereof is omitted since it departs from the subject matter of the present invention. Thus, by considering a distance between microphones mounted on a noise removal apparatus of the present invention, the volume of the voice signal input through the noise direction microphone can be measured.

The input signal input through each microphone 410, 420 in this way is converted to a frequency domain signal by each frequency domain conversion unit 430A, 430B. That is, the input time domain signal is converted to a frequency domain signal. In a signal output from the frequency domain conversion unit 430A, that is a speaker direction signal, and a signal output from the frequency domain conversion unit 430B, that is a noise direction signal, the volume of noise signals in two output signals is similar as described above and only the volume of voice signals is different. Herein, since a difference between voice signals of two output signals can be known in advance by a measurement, a speaker direction signal is decreased a times by a multiplier 450 when a difference ratio is $\alpha$ in FIG. 4. Then, a subtraction unit 455 can decrease a voice signal component in the noise direction signal as Much as possible by subtracting the $\alpha$ time-decreased speaker direction signal from the noise direction signal. The noise direction signal with the voice signal component decreased is transmitted to the noise clustering unit 460.

There are various reasons for the occurrence of the sound quality distortion due to noise still after a noise removal in the prior art, such as the mixture of various types of noise with the voice signal, etc. One of the various reason is the difficulty in precisely detecting noise in the noise section. This means that it is important to remove the noise by a similarity level to the noise section after detecting the voice section and the noise section basically in order to minimize a sound quality distortion as described above. Therefore, the present invention uses a method of attenuating a voice signal component to detect a noise type in the noise section of a noise-mixed voice signal.

On the other hand, some of the signals output through each frequency domain conversion unit 330A, 330B are transmitted to the bin comparator 440. The bin comparator 440 acts to perform the size comparison of frequency domain data between the noise direction signal and the speaker direction signal in each frequency bin. Here, the bin comparator 440 uses Equation (1) below for dimension comparison.

$$\text{if } X(f) \geqq \beta Y(f) \text{ then, count=count+1} \quad (1)$$

In Equation (1), X(f) refers to frequency data of the speaker direction signal, Y(f) refers to frequency data of the noise direction signal, and β refers to a margin value. Herein, β acts to further decrease a voice signal component to have pure noise left after the voice signal component is subtracted from a frequency direction signal. The count increases each time frequency data of a speaker direction signal is bigger than frequency data of a noise direction signal multiplied by the margin value. By performing the size comparison for all the frequency domain values in one frame as described above and then using the count according to the comparison result, it is determined if the current section is a voice section or a noise section. Here, the determination between a voice section and a noise section is performed for each frame. For this determination, Equation (2) below is used.

$$\text{If count} \geqq \gamma_{th} \text{ then, speech=1 else speech=0} \quad (2)$$

In Equation (2), $\gamma_{th}$ is defined as the average of count values between frames corresponding to the initial signal section of several tens of milliseconds. Through Equation (2), it is determined if the current section is a voice section or a noise section. That is, if the current frame is a voice frame or a noise frame is determined. When the current frame is a noise section, information on the noise section is transmitted to the noise clustering unit 460, and the determined section information is transmitted to a noise removal algorithm 470.

The noise clustering unit 460 receives a noise direction signal, from which a voice signal has been subtracted, from the subtraction unit 455, and receives noise section information from the bin comparator 440. Then, the noise clustering unit 460 classifies frequency data of a frame, which has been determined as a noise section, by using a clustering technique. That is, the noise clustering unit 460 obtains characteristic vectors in the noise section, and classifies them by using the clustering technique. The reason why the clustering technique is used is based on the fact that the noise type may change even within one noise section. Due to that reason, noise is classified into various groups and is then removed by using the noise nearest to the noise of the current time point. Accordingly, when various types of noise are mixed in a noise section, the noise clustering unit 460 classifies the noise into one or more groups.

The noise clustering unit 460 calculates a similarity level for the noise classified through the clustering by using noise metrics. As basic noise information for calculating the similarity level for the classified noise, noise information updated through a previous clustering is used. Through the calculation of a similarity level as described above, a noise type in a noise section can be determined. Herein, the noise metrics refers to noise information which is updated and stored through a previous clustering. As a method of calculating the similarity level, Euclidean Distance, Mahalanobis Distance, etc. can be used. Especially, Mahalanobis Distance can calculate a more precise similarity level by using covariance values in finding the similarity level, and this is expressed by Equation (3) below.

$$(X_i - Y_i)S_i^{-1}(X_i - Y_i) \quad (3)$$

In Equation (3), the letter S indicates a covariance matrix.

By this, a similarity level between basic noise and classified noise is calculated. For example, when noise mixed in the noise section are classified into three types, the noise clustering unit 460 calculates a similarity level between each classified noise and the basic noise, and determines noise having a highest similarity level of the classified noise. As described above, the type of a noise signal can be determined based on a calculated similarity level, and noise information can be updated using the highest similarity level noise and the basic noise. The determined noise and/or updated noise information is transmitted to a noise removal algorithm 470. Herein, the noise removal algorithm 470 is a component of the noise removal apparatus, which can be implemented by software or in one module by hardware. Thus, the noise removal algorithm 470 can understand that the voice signal is mixed with noise determined by the noise clustering unit 460. Then, the noise removal algorithm 470 subtracts noise corresponding to the determined noise type from the noise-mixed voice signal in the noise section by using a section determination result transmitted from the bin comparator 440. That is, the noise removal algorithm 470 can output a voice signal with the noise efficiently removed by subtracting the nearest noise corresponding to a determined noise type from the firstly input signal through the speaker direction microphone. As a subtraction method, a spectral subtraction method, Wiener filtering method or MMSE-STSA (Minimum Mean Square Error-Short Time Spectral Amplitude) method can be used, so as to minimize the sound quality distortion.

A remaining noise eliminator 480 performs post-processing by removing a remaining noise because the remaining noise exists in a signal having noise removed as described above. Such a remaining noise-removed signal is transmitted to a time domain conversion unit 490.

The time domain conversion unit 490 converts the transmitted signal again to a time domain signal because the transmitted signal is a frequency domain signal.

Figure 5:
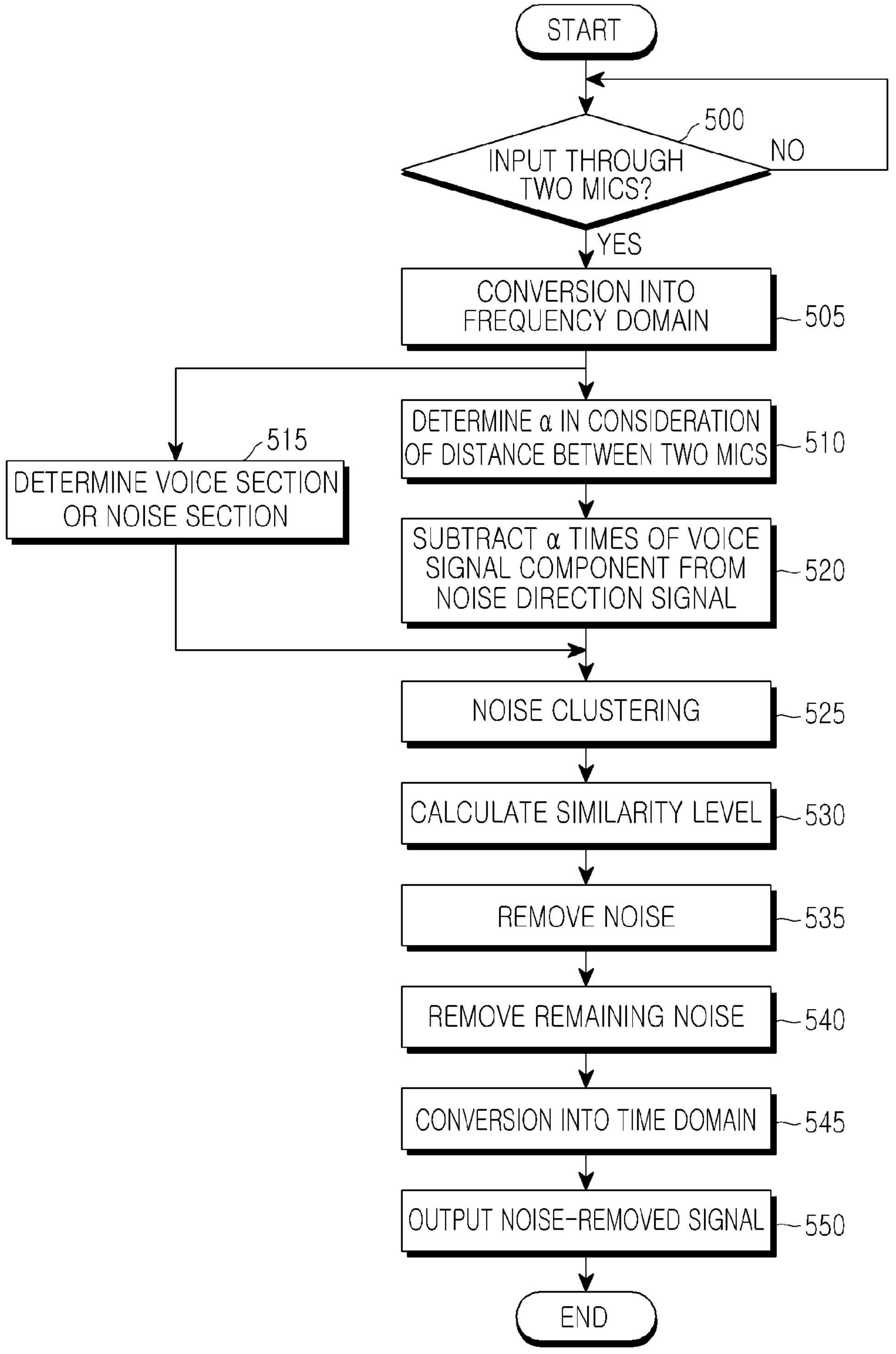
FIG. 5 is a flow diagram of a noise removal operation according to an embodiment of the present invention.

FIG. 5 is a flow diagram showing a noise removal method in a noise removal apparatus according to an embodiment of the present invention, and FIG. 5 assumes a case where a speaker direction microphone and a noise direction microphone are placed at a certain distance as shown in FIG. 4.

As shown in FIG. 5, a noise removal step mainly includes the steps of inputting a voice signal through a two channel microphone, subtracting a voice signal component from a voice signal mixed with noise, clustering noise, calculating a similarity level and removing noise by using the similarity level, removing remaining noise, converting the voice signal to a time domain signal, and outputting a noise-removed signal.

Referring to FIG. 5, when a voice signal is input through two microphones in a noise removal apparatus in step 500, each input signal is converted to a frequency domain signal in step 505 since the input signal is a time domain signal. In step 510, in order to subtract a voice signal component in consideration of the distance between two microphones, α is determined in consideration of that distance. Here, as the volume of a voice signal according to a distance between two microphones can be obtained in advance, α value is determined correspondingly. Then, in step 520, α times of a voice signal component is subtracted from a noise direction signal being input through the noise direction microphone. To detect a noise type in the noise section, a method of attenuating the voice signal component in the noise-mixed voice signal is used.

Also, in order to detect the noise type in a noise section, an operation of determining if the current section is a voice section or a noise section is required. According to this, after each signal is converted to a frequency domain signal in step 505, the noise removal apparatus determines if the current section is a voice section or a noise section in step 515 while performing the operation of subtracting the voice signal component. Specifically, the noise removal apparatus performs dimension comparison between frequency data of each converted signal in each frequency bin, and determines if the current section is a voice section or a noise section, according to a count result of the dimension comparison. The section determination is performed for each frame.

Thereafter, the noise removal apparatus performs noise clustering by using the section determination result and the noise direction signal, from which the voice signal component has been removed, in step 525. Since not a single type of noise but multiple types of noise may be mixed in the noise section, the noise clustering classifies noise into various groups. When noise has been classified as described above, the noise removal apparatus calculates a similarity level between the classified noise and previously stored noise information in step 530. The noise removal apparatus uses noise information at a highest similarity level among the calculated similarity levels to remove noise corresponding to the noise information from the speaker direction signal, that is the noise-mixed voice signal. Also, the noise removal apparatus determines the type of the noise signal based on the calculated similarity level and then updates noise information.

Then, the noise removal apparatus removes a remaining noise in step 540, converts the frequency domain signal to a time domain signal in step 545, and then outputs a noise-removed signal in step 550. As described above, the present invention can employ noise information, which has been classified into multiple noise groups through clustering, can find the nearest noise information among the noise based on a similarity level, and can remove noise using this, so as to minimize the distortion of a sound quality.

Figure 6A:
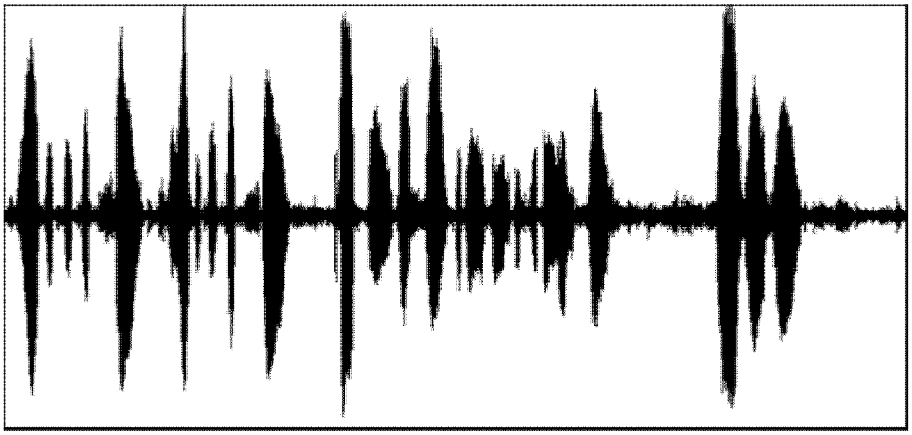
FIGS. 6A and 6B are signal output diagrams before/after noise removal according to an embodiment of the present invention.
Figure 6B:
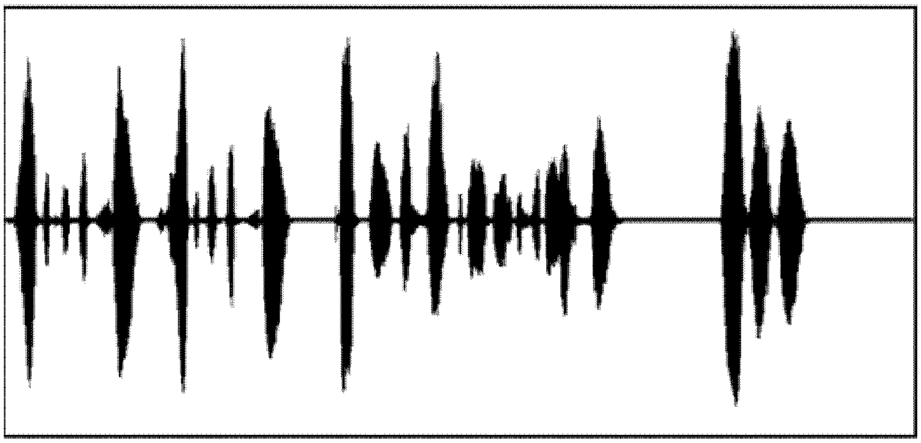

As described above, when the noise has been removed according to the present invention, a signal waveform as shown in FIG. 6B is converted to a signal waveform before noise removal as shown in FIG. 6A. It is noted from FIG. 6B in comparison with FIG. 6A that a noise reverberation in the signal waveform has been considerably removed after noise removal. Therefore, a signal, from which noise has been fully removed, can be obtained only by two microphones, even in a severe reverberation environment.

According to the present invention, it is possible to efficiently remove even noise that propagates through a variety of paths before being input via a microphone. In addition, if it is a voice section or a noise section can be more precisely determined by employing two channel information, and noise added in the voice section can be easily separated using the determination. Also, even in a severe reverberation environment, a noise-removed signal can be obtained by two microphones, and the distortion of a sound quality can also be minimized.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A noise removal apparatus to receive a signal comprising a first and a second voice signal and including a first microphone mounted close to a speaker and at least one second microphone spaced a predetermined distance from the first microphone, comprising:

a first and second frequency domain conversion units to convert the first and the second voice signal mixed with noise to frequency domain signals when the first and second voice signals are input from each of the microphones;

a bin comparator to determine a voice section and a noise section using each of the converted first and second voice signals and to determine whether a current section of the signal is the voice section or the noise section using each of the converted first and second voice signals;

a subtraction unit to subtract a voice signal component from the converted second voice signal;

a noise clustering unit to determine, based on a result of the determination by the bin comparator, the noise type of the second voice signal, in which the voice signal component has been subtracted in the noise section; and a noise removal algorithm unit to remove noise corresponding to the noise type from the converted first voice signal.

2. The noise removal apparatus of claim 1, wherein the subtraction unit subtracts the voice signal component, which corresponds to a difference ratio of voice signals in consideration of a distance between two microphones, from the converted second voice signal.

3. The noise removal apparatus of claim 1, wherein the bin comparator increases a count value each time frequency data of the first voice signal is bigger than frequency data of the second voice signal multiplied by a margin value, performs dimension comparison between the data in each frequency bin, and then determines, using a count value based on a result of the comparison, if the current section is a voice section or a noise section.

4. The noise removal apparatus of claim 1, wherein the noise clustering unit classifies noise into at least one type through clustering over the noise section, calculates a similarity level between basic noise and the classified type of noise, and determines noise of a highest level in the calculated similarity level.

5. The noise removal apparatus of claim 4, wherein the basic noise corresponds to noise updated through a previous clustering.

6. The noise removal apparatus of claim 1, further comprising: a remaining noise eliminator for removing remaining noise from the noise-removed signal; and a time domain conversion unit for converting the remaining noise-removed signal into a time domain signal.

7. A noise removal method by a noise removal apparatus that receives a signal comprising a first and a second voice signal and that includes a first microphone mounted close to a speaker and at least one second microphone spaced a predetermined distance from the first microphone, the method comprising:

converting the first and the second voice signal mixed with noise to frequency domain signals when the first and second voice signals are input from each of the microphones;

determining a voice section and a noise section using each of the converted first and second voice signals and determining if a current section of the signal is the voice section or the noise section;

subtracting a voice signal component from the converted second voice signal;

based on a result of the determination, determining the noise type of the second voice signal, in which the voice signal component has been subtracted in the noise section; and removing noise corresponding to the noise type from the first voice signal.

8. The noise removal method of claim 7, wherein the step of determining if the current section is a voice section or a noise section comprises the step of performing the section determination by using the each converted signal.

9. The noise removal method of claim 7, wherein the step of determining if the current section is a voice section or a noise section comprises the steps of: increasing a count value each time frequency data of the first voice signal is bigger than frequency data of the second voice signal multiplied by a margin value; and performing dimension comparison between the data in each frequency bin and then determining, by using a count value according to a result of the comparison, if the current section is a voice section or a noise section.

10. The noise removal method of claim 7, wherein the step of determining the noise type comprises the steps of: classifying noise into at least one type through clustering over the noise section; calculating a similarity level between basic noise and the classified type of noise; and determining noise of a highest level in the calculated similarity level.

11. The noise removal method of claim 10, wherein the basic noise corresponds to noise updated through previous clustering.

12. The noise removal method of claim 7, further comprising the steps of: removing remaining noise from the noise-removed signal; and converting the remaining noise-removed signal into a time domain signal.

* * * * *